J. BEHR, Jr.

PLEASURE RAILWAY.

APPLICATION FILED APR. 13, 1918.

Reissued Oct. 28, 1919.

14,742.

2 SHEETS—SHEET 1.

Witnesses
R. A. Thomas.

Inventor
John Behr, Jr.

By Victor J. Evans
Attorney

J. BEHR, JR.

PLEASURE RAILWAY.

APPLICATION FILED APR. 13, 1918.

Reissued Oct. 28, 1919.

14,742.

2 SHEETS—SHEET 2.

Witnesses
R. a. Thomas

Inventor
John Behr, Jr.

By Victor J. Evans
Attorney

UNITED STATES PATENT OFFICE.

JOHN BEHR, JR., OF MIDDLE VILLAGE, NEW YORK.

PLEASURE-RAILWAY.

14,742. Specification of Reissued Letters Patent. Reissued Oct. 28, 1919.

Original No. 1,244,411, dated October 23, 1917, Serial No. 149,353, filed February 17, 1917. Application for reissue filed April 13, 1918. Serial No. 228,470.

*To all whom it may concern:*

Be it known that I, JOHN BEHR, Jr., a citizen of the United States, residing at 8 Repper avenue, Middle Village, Long Island, in the county of Queens and State of New York, have invented new and useful Improvements in Pleasure-Railways, of which the following is a specification.

This invention relates to toy railways, and also to those intended for pleasure riding or amusement; and the object of the same is to produce a toy or merry-go-round of this kind in which a circular track is given a gyrating motion so that a car or cars will travel thereon automatically and by gravity and momentum.

The object is carried out by the machine whose details are hereinafter described and claimed, and as shown in the drawings wherein:—

Figure 1:
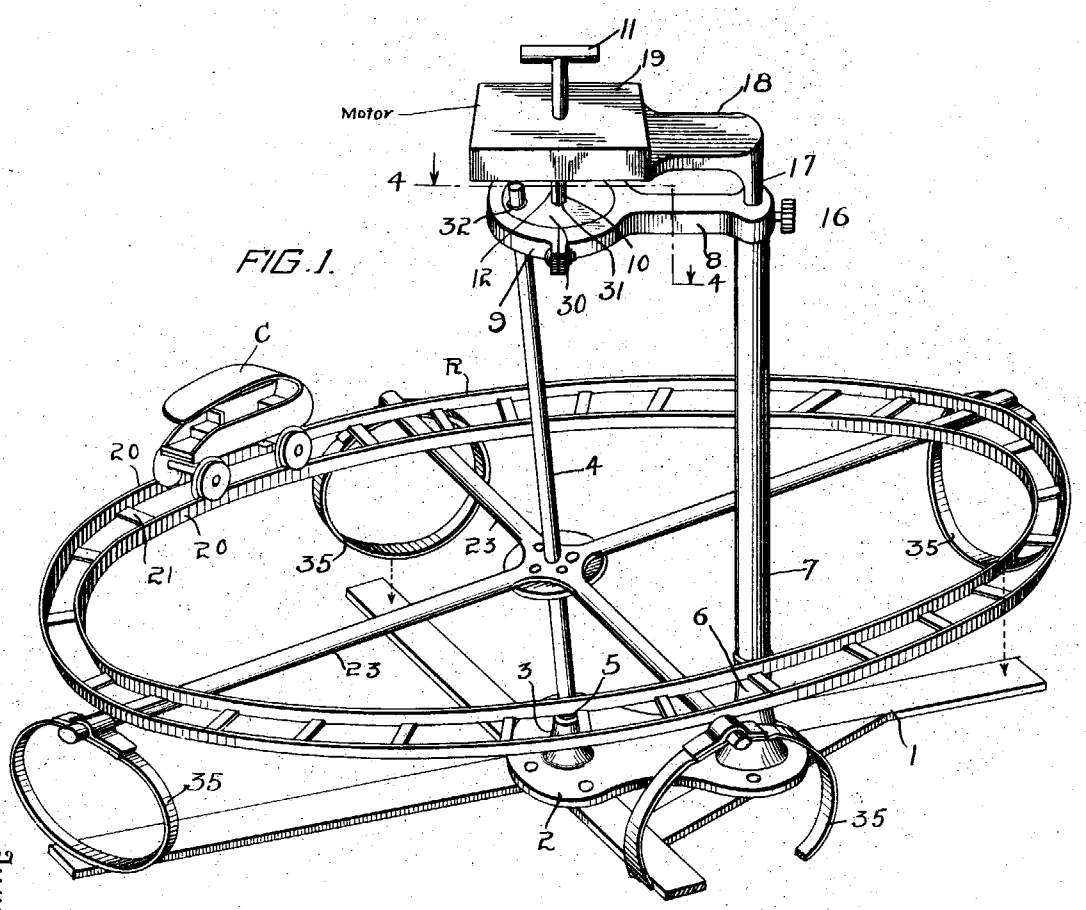
Figure 1 is a general perspective view of this machine complete.
Figure 2:
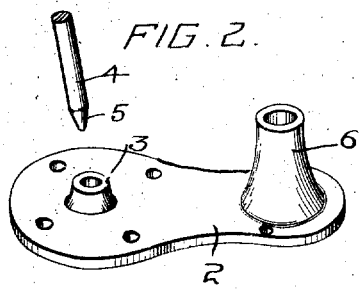
Fig. 2 is a detail of the step bearing of the main shaft.
Figure 4:
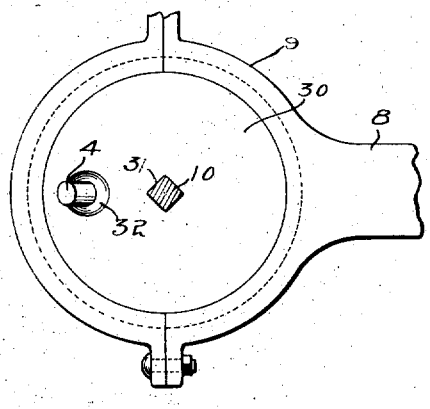
Fig. 4 is a horizontal section on the line 4—4 of Fig. 1.
Figure 5:
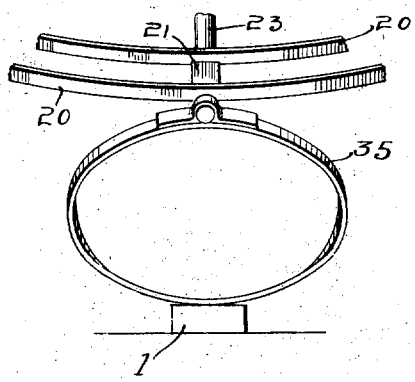
Fig. 5 is a detail showing one of the rebounding springs as contacting with an obstruction such as a part of the base.

The base comprises crossed beams 1 which may be of any suitable length and number, and at their point of crossing which is the center of the entire device is supported a step bearing best seen in Fig. 2. This may be a casting 2 having a socket 3 for the main shaft 4 which stands substantially upright and has a reduced and nearly pointed tip 5 at its lower end resting in said socket. From this point the casting leads to one side and has a sleeve 6 supporting an upright standard 7 which is tubular at its upper end, and at its upper extremity carries an arm 8 leading in the same direction and to the same extent as the length of the casting. The arm carries a bearing, which in Fig. 4 is shown as a ring 9, the center of said ring being directly over the socket 3 for a purpose yet to be described. Mounted within the tubular upper portion of the standard is the shank 17 of a movable bracket, capable of adjustment by means of a set screw 16 or other device, and this bracket has a horizontal arm 18 overlying the arm 8 and supporting at its free end a motor which I have shown diagrammatically in the drawings and numbered 19. This motor may be driven by springs, by steam, by electricity, or by other suitable means, the motive agent forming no part of the present invention, but it is desirable that the power shaft 12 shall be movable vertically through the motor and shall have a handle 11 at its upper end and be squared or made angular at its lower end as at 10, whereby the shaft may be slipped downward so that the squared lower end shall pass through the center of the bearing ring 9 shown in Fig. 4.

The railway is broadly designated by the letter R, and the car by the letter C. The construction of the latter is entirely unimportant, but by preference it travels on wheels which in turn travel on rails 20 connected by ties 21 and forming an annular or ring-shaped track which is of considerable size. The track is carried on a large spider 23 whose arms or bars are two in number in the drawings, one crossing the other at the center of the ring shaped track and the outer ends of each supporting the track or railway; and at the point of crossing these arms are secured rigidly upon the main shaft 4. I have shown but a single car C, and it travels on the rails 20 of the track, its movement being continuous and in one direction only. I have omitted the platform and the station where the passengers alight from the car and give their places to another group as usual where the device is adapted for use as an amusement railway or merry-go-round. I have shown but two cross bars in the spider, but obviously there could be a greater number, and I have not thought it necessary to show braces which will be provided to hold the railway R, rigid, in a single plane, and substantially circular throughout its course. I might say at this point, however, that a truly circular railway or track is not necessary, nor is it absolutely necessary that the same shall stand exactly in one plane. In an amplified construction of the device there might be more than one track on the base and a car or cars on each track, or each car might be amplified into a train of cars. All these details may be left to the manufacturer and user.

Figure 3:
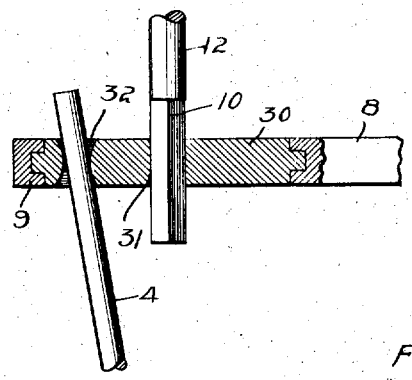
Fig. 3 is a vertical sectional view through the driving mechanism for the upper end of the main shaft, and the means for supporting the same.

Rotatably mounted within the ring or bearing 9 is an eccentric impeller, herein shown as consisting of a disk 30 whose periphery moves within the ring and whose center has a squared hole 31 for receiving the squared portion 10 of the power shaft 12 when said shaft is pressed downward by means of its handle. The disk also has an off-center or eccentric bearing in the shape of a round hole 32 through which loosely projects the upper end of the main shaft 4 as best seen in Figs. 3 and 4.

With this construction of parts, when the motor is started and the power shaft engaged with the impeller disk, the rotation of the latter swings the upper end of the main shaft around a circle whose radius is the same as the distance between the holes 31 and 32. Meanwhile the lower end of this shaft is stepped in the bearing or socket 3 wherein it fits loosely. The spider fast on the main shaft carries the railway R, and therefore the movement of the shaft imparts a gyrating motion to the entire railway so that any given point rises and falls rather slowly and in direct opposition to a point diametrically opposite, and this tilting or gyrating movement of the railway is continued so that the car C is caused to travel always down grade because the track immediately in rear of it is continuously rising. I wish it understood that the railway does not revolve, as the shaft 4 is not rotated but simply moved around a circle by the impeller as described.

At appropriate points on the railway, and preferably at the outer ends of the bars 23, are mounted springs, herein shown in the shape of large loops 35, and when any point descends it is the intention that this spring shall strike the ground or perhaps the base 1 and cause this point to rebound if the movement is rapid, or in any event to rise again under the expansion force of the spring when thus depressed. This detail is provided to assist the low side of the railway in rising, because it is obvious that when the main shaft and everything carried thereby is tilted to one side, that side becomes a little heavier and needs some assistance in order that it may regain its original horizontal position without throwing undue resistance on the motor and the impeller. It is quite possible that the degree of gyration may be altered, whereas the speed of movement is of course controlled by advancing or retarding the speed of rotation of the motor 19.

The invention when used as a pleasure railway of this kind may be installed at seaside resorts, on playgrounds, or within any suitable inclosure, and it can be driven by any appropriate power which is available. If properly built, it needs little or no attention as there are few moving and wearing parts and little mechanism to get out of order. If the enterprise should become popular it is quite possible to lay an additional ring-shaped base at any time upon the spider, and duplicate the single pair of rails 20 shown in the drawings, adding cars as may be necessary.

What is claimed as new is:—

1. In an amusement device of the class described, the combination of a base comprising crossed beams and a step bearing at their point of crossing, a standard rising from the base, a motor carried by the standard, and a horizontal disk revolved by said motor and having an off-center hole; of a car, a substantially circular track on which the car is mounted, an upright shaft mounted at its lower end in said step bearing and at its upper end in said hole, a spider carried by the shaft and supporting said track, and looped springs depending from the arms of the spider and adapted to strike the beams of the base successively as the track is gyrated.

2. In an amusement device of the class described, the combination with a practically horizontal member having an annular track around it, a practically upright shaft fixed through said member, and a step bearing for supporting the lower end of the shaft; of a ring bearing directly above said step bearing, an impeller mounted in said ring bearing and having an off-center connection with the upper end of said shaft and an angular hole at its center, a superimposed motor, and a power shaft longitudinally movable through the motor and made angular for connection with the hole at the center of the impeller.

3. In an amusement device of the class described, the combination with a base, a casting thereon having a step bearing and a sleeve, a standard rising from the sleeve and tubular at its upper end, its upper extremity having a lateral arm with an annular bearing directly above said step bearing, a bracket having a shank adjustably mounted in the tubular upper end of the standard and a lateral arm overlying that of the standard, and a motor carried by the last-named arm; of a gyrating skeleton platform including a spider through which said standard extends and an annular track carried by the spider, a main shaft fast through the center of the spider and stepped at its lower end in said lower bearing, a rotary impeller mounted in said upper bearing and driven by said motor, and an off-center connection between the impeller and the upper end of said shaft.

4. In an amusement device of the class described, the combination of a fixed standard, a substantially upright shaft at one side of said standard, an object supporting element encircling both the standard and shaft and supported by the latter, a fixed bearing for the lower end of said shaft, means including a motor for causing the upper end of said shaft to move in a circular path, and means carried by said object supporting element for resiliently cushioning the latter at intervals and causing a rebounding action thereof.

In testimony whereof I affix my signature.

JOHN BEHR, Jr.

Copies of this patent may be obtained for five cents each, by addressing the "Commissioner of Patents, Washington, D. C."